(12) United States Patent
Piggott et al.

(10) Patent No.: US 11,879,979 B2
(45) Date of Patent: Jan. 23, 2024

(54) METHOD AND APPARATUS FOR DYNAMIC RECONFIGURATION OF REGION OF INTEREST IN INTEGRATED FMCW LIDAR

(71) Applicant: Pointcloud Inc., San Francisco, CA (US)

(72) Inventors: Alexander Yukio Piggott, San Mateo, CA (US); Alexander Alexeevich Gondarenko, San Jose, CA (US); Steven Andrew Fortune, Wanaka (NZ); Andrew James Compston, San Francisco, CA (US); Robert Francis Wiser, San Francisco, CA (US); Remus Nicolaescu, San Francisco, CA (US)

(73) Assignee: Pointcloud Inc., San Francisco, CA (US)

( * ) Notice: Subject to any disclaimer, the term of this patent is extended or adjusted under 35 U.S.C. 154(b) by 702 days.

(21) Appl. No.: 17/033,262

(22) Filed: Sep. 25, 2020

(65) Prior Publication Data

US 2021/0096259 A1    Apr. 1, 2021

Related U.S. Application Data

(60) Provisional application No. 62/907,336, filed on Sep. 27, 2019.

(51) Int. Cl.
    *G01S 17/894* (2020.01)
    *G01S 7/493* (2006.01)
    *G01S 17/32* (2020.01)

(52) U.S. Cl.
    CPC ............ *G01S 17/894* (2020.01); *G01S 7/493* (2013.01); *G01S 17/32* (2013.01)

(58) Field of Classification Search
    CPC ........ G01S 17/894; G01S 17/32; G01S 7/493; G01S 7/4817; G01S 7/4911; G01S 7/4918; G01S 17/34; G01S 17/42; G01S 17/89
    USPC ....................................................... 356/4.01
    See application file for complete search history.

(56) References Cited

U.S. PATENT DOCUMENTS

| | | |
|---|---|---|
| 2015/0378023 A1 | 12/2015 | Royo Royo et al. |
| 2018/0059248 A1 | 3/2018 | O'Keeffe |
| 2018/0074175 A1 | 3/2018 | O'keeffe |
| 2018/0364333 A1 | 12/2018 | Jungwirth et al. |
| 2020/0034638 A1 | 1/2020 | Brewington et al. |

FOREIGN PATENT DOCUMENTS

| | | |
|---|---|---|
| WO | 2018160729 | 9/2018 |
| WO | 2021062236 | 4/2021 |

OTHER PUBLICATIONS

"International Application Serial No. PCT US2020 052838, International Preliminary Report on Patentability dated Apr. 7, 2022", 9 pgs.

(Continued)

*Primary Examiner* — Daniel L Murphy
(74) *Attorney, Agent, or Firm* — Schwegman, Lundberg & Woessner, P.A.

(57) ABSTRACT

A dynamically reconfigurable Light Detection and Ranging (LiDAR) system can generate improved ranging data one or more regions of three-dimensional (3D) images generated by the system. The images can be segmented, and global or local optical characteristics (e.g., power, illumination duration, bandwidth, framerate frequency) of the light can be modified to increase the 3D image quality for the segments of the image.

20 Claims, 18 Drawing Sheets

(56) References Cited

OTHER PUBLICATIONS

"European Application Serial No. 20869506.4, Extended European Search Report dated Oct. 21, 2022", 9 pgs.
"International Application Serial No. PCT US2020 052838, International Search Report dated Dec. 18, 2020", 2 pgs.
"International Application Serial No. PCT US2020 052838, Written Opinion dated Dec. 18, 2020", 7 pgs.

METHOD AND APPARATUS FOR DYNAMIC RECONFIGURATION OF REGION OF INTEREST IN INTEGRATED FMCW LIDAR

PRIORITY

This application claims the benefit of priority to U.S. Provisional Patent Application Ser. No. 62/907,336, filed Sep. 27, 2019, which is incorporated by reference herein in its entirety.

BACKGROUND

Field of light detection and ranging (LIDAR) 3D imaging can be difficult to integrate in real-world applications, such as an autonomous vehicle that must respond to dynamic real-world environments. For example, an autonomous car travelling down a road can encounter different objects for analysis using on-board computer vision system. However, the objects to be detected can have different spectral qualities, and furthermore may be stationary or may be moving relative to the vehicle, which can make CV-based navigation difficult or impractical for the vehicle.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

Figure 1A:
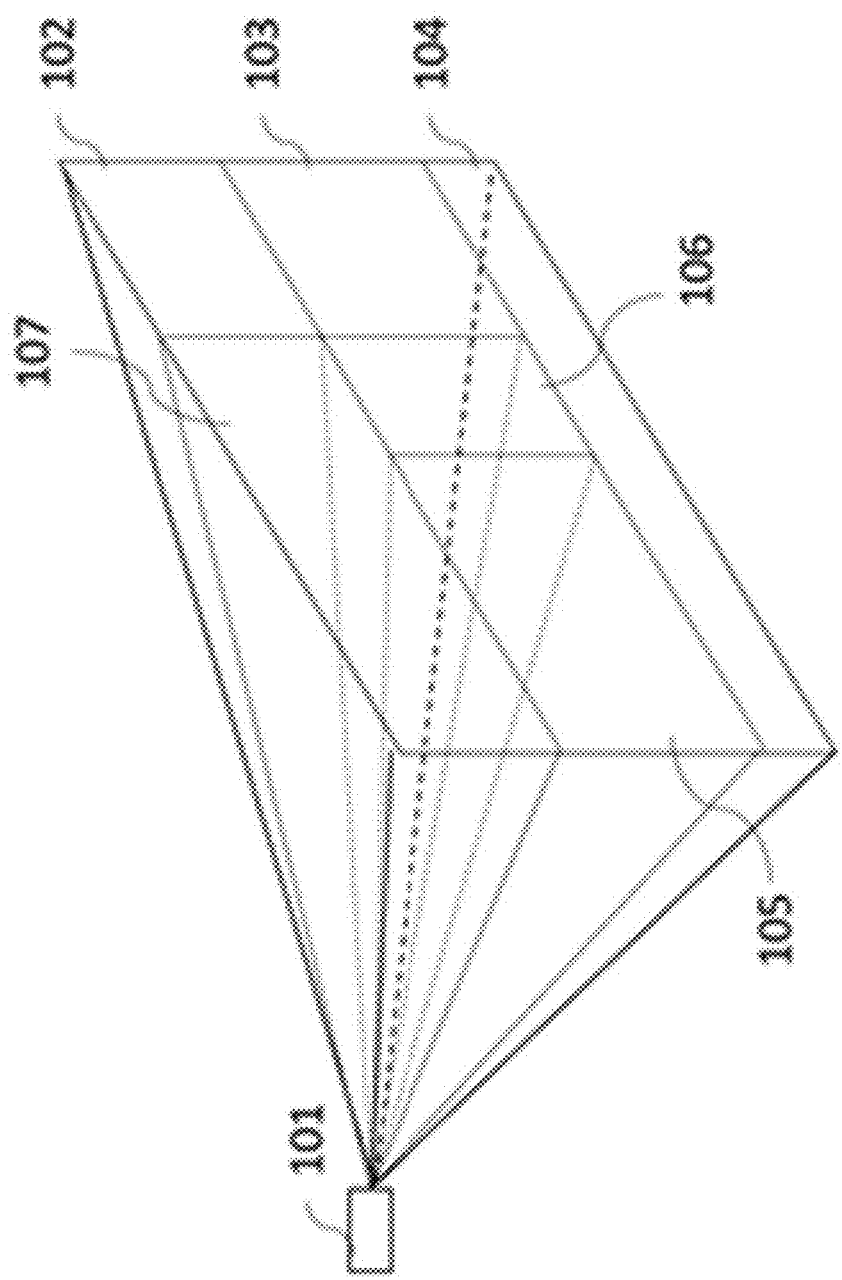
FIGS. 1A and 1B display a transmitter, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

For illumination of the target in LiDAR based 3D imaging systems, two approaches include: (1) illuminating an entire scene and detecting light on a plane array, and (2) beam steering to different areas for detection. In the first approach, the entire scene illuminated at once and the return light is simultaneously detected on a focal plane array, where each pixel of the array detects light from one direction. In this implementation the range of the system is limited because the range in a coherent LiDAR system is proportional with the intensity of the laser illuminator on the target and as the photons are spread over a very large area the intensity decreases inversely proportional to the illuminated area. In order to achieve long-range the divergence of the laser illuminator needs to be maintained very low to maximize the intensity on the surface of the target. In the second approach, a beam scanning mechanism steers light to different areas. As implementations for laser beam scanning over surface of the target several options are being utilized today, they require a moving component: rotating or oscillating mirrors, rotating prisms, microelectromechanical (MEMS) systems/mirrors to function. Beam steering can be implemented using an optical phased array however such systems are large and high resolution results are impractical. Currently none of the mechanical beam scanning approaches have the capability to arbitrarily adjust the range of interest area in real time, due at least in part to the significant inertia that such systems possess. Optical phased arrays can have low inertia to implement real time dynamic adjustment of region of interest, however such systems suffer from high optical losses which limits their practical implementations.

Dynamically reconfigurable region of interest in LIDAR based 3D imaging allows for increased efficiency and performance of the system as illumination of the scene is directed preferentially in the areas of interest within the overall field of view. In autonomous navigation it allows the navigation engine to request additional data from an area in the environment where an obstacle has been detected though insufficient information exists to identify its nature, and further enables the navigation engine to deprioritize the areas of lower interest. The present method and apparatus configure a LiDAR based 3D imaging system to segment the total field of view of the imaging system into multiple segments with each segment having a distinct ensemble of parameters as needed to provide the downstream application that is using the 3D imaging sensor with the appropriate level of performance. In one embodiment, the LiDAR based 3D imaging system may receive a request for additional information from the autonomous navigation algorithms (e.g., applications) and configure the sensor in real time to enhance the amount of information from the region of interest while de-prioritizing information from other regions within the field of view of the imaging system. In one embodiment, the segmentation of the field of view may be done within each frame while in another embodiment the segmentation is achieved by overlapping an ensemble of frames with different characteristics. In addition, the present invention provides an implementation of the system using a silicon photonics integration platform.

In one embodiment, the field of view of the LiDAR system is divided into a number of i field of view segments with each segment having different perception requirements. In one embodiment, each FOV-i segment is characterized by an ensemble of parameters of the LiDAR based 3D imaging system comprised of: duration of illumination for each position of the beam scanning mechanism within that field of view segment, laser power per outbound laser beam, temporal length, shape and bandwidth of the frequency chirp, and acquisition frame rate. In one embodiment, those above parameters are calculated based on an ensemble of three-dimensional imaging and velocity mapping requirements. In one embodiment, the field of view of the LiDAR transmitter 101, is divided into segments 102, 103, 104, 105, 106, 107 as shown in FIG. 1A. Each of the segments 102, 103, 104, 105, 106, 107 are characterized by an ensemble of parameters: duration of illumination for each position of the beam scanning mechanism, laser power per outbound laser beam, temporal length, shape and bandwidth of the frequency chirp, acquisition frame rate. In one embodiment, the ensemble of parameters in segment 102 of the field of view is duration of illumination 5 microseconds per steering position, laser power 10 mW, length of the chirp 5 microseconds, sawtooth shape, bandwidth of the chirp 10 GHz, frame rate 20 Hz.

In segment 103, increased probability of detection and higher accuracy is desired in order to identify an object within that segment. In order to achieve that, an increase in the signal to noise ratio is necessary and therefore the system parameters within the segment 103 are modified to be duration of illumination 10 microseconds, laser power 15 mW, length of the chirp 10 microseconds, sawtooth shape, bandwidth of the chirp 10 GHz, frame rate 20 Hz.

In segment 104, of the field off view, higher depth resolution is desired and therefore the chirp bandwidth is increased 20 GHz while the frame rate is 20 Hz, laser power is 15 mW, while ramp duration is 10 microseconds and ramp shape are a sawtooth shape.

In one embodiment, within segment 105 of the field of view a moving object is expected therefore the frequency chirp shape is configured to a symmetrical up and down ramp in order to capture directly velocity information through Doppler effect. In some example embodiments, moving objects are detected within a given segment by comparing multiple frames and applying object movement, detection, and alignment schemes, via processor of the system, such as SIFT.

In one example embodiment, segment 106 requires very dense, accurate distance and velocity information and as such the frame rate is set at 20 Hz, the laser power is set at 30 mW, chirp bandwidth at 10 GHz and ramp length at 10 microseconds. In one embodiment, segment 107 falls outside the field of view of interest and is therefore not scanned.

The above parameters are provided as examples only and they can be in a range such as: the length of illumination for each point within the field of view from 1 microsecond to 1 millisecond, the frequency chirp temporal length from 1 microsecond to 1 millisecond, for the chirp bandwidth from 100 MHz to 1000 GHz, for the frame rate from 1 Hz to 1000 Hz, for the laser power from 0.01 mW to 10 W. The shape of the ramp can be both symmetrical up and down shapes to provide for distance and Doppler velocity measurements as well as asymmetrical shapes to provide for distance measurements only. Also, the combinations of parameters are used for illustrative purposes only and any combination of parameters can be used in each of the field of view segments. In addition, other parameters may be used to segment the field of view into segments.

Figure 1B:
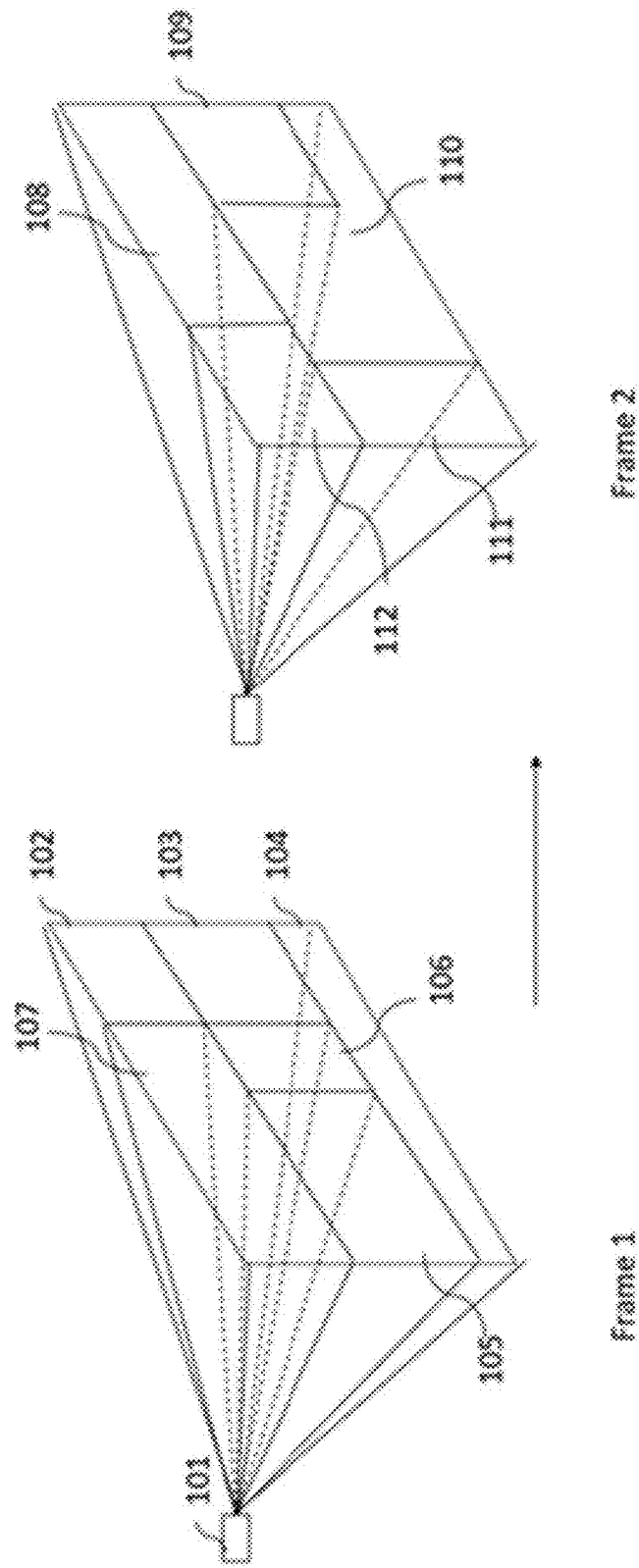

In one embodiment, the field of view segmentation can be done within one frame with the next frame providing a different segmentation of the field of view within the next frame as shown in FIG. 1B. In the embodiment in FIG. 1B, for frame 1 the field of view is segmented into segments 102, 103, 104, 105, 106, and 107 each segment having its own set of parameters such as duration of illumination for each position of the beam scanning mechanism, laser power per outbound laser beam, temporal length, shape and bandwidth of the frequency chirp, while subsequent frame 2 is segmented into field of view segments 108, 109, 110, 111, and 112 having its own set of parameters such as duration of illumination for each position of the beam scanning mechanism, laser power per outbound laser beam, temporal length, shape and bandwidth of the frequency chirp. Any of the same type of parameter may be the same or different. The number of segments the frame is segmented in may be the same or different from frame to frame.

Figure 2A:
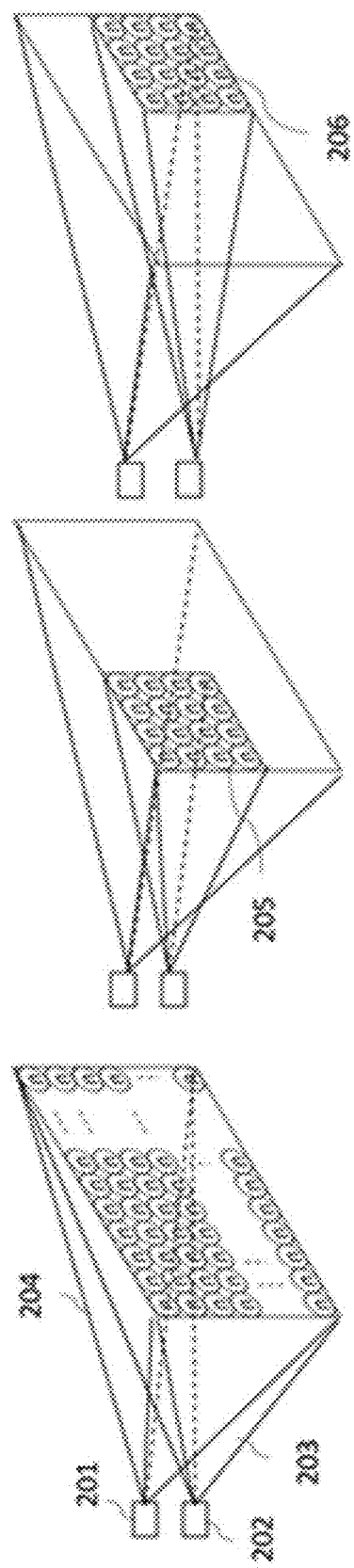
FIG. 2A-2E show example configurations of a transmitter that functions with a scanning array, according to some example embodiments.

In one embodiment illustrated in FIG. 2A, the transmitter 201 shares the same field of view as the receiver 202 and both the transmitter's beam scanning array and the receiver array readout are configured to scan and respectively read the entire common field of view. In one embodiment in the subsequent frame or succession of frames the transmitter's beam scanning array and the receiver array readout are configured to scan and respectively read a reduced segment of the common field of view 205 while in the subsequent frame or succession of frames the transmitter's beam scanning array and the receiver array readout are configured to scan and respectively read a different reduced segment 206 of the common field of view as illustrated in FIG. 2A.

Figure 2B:
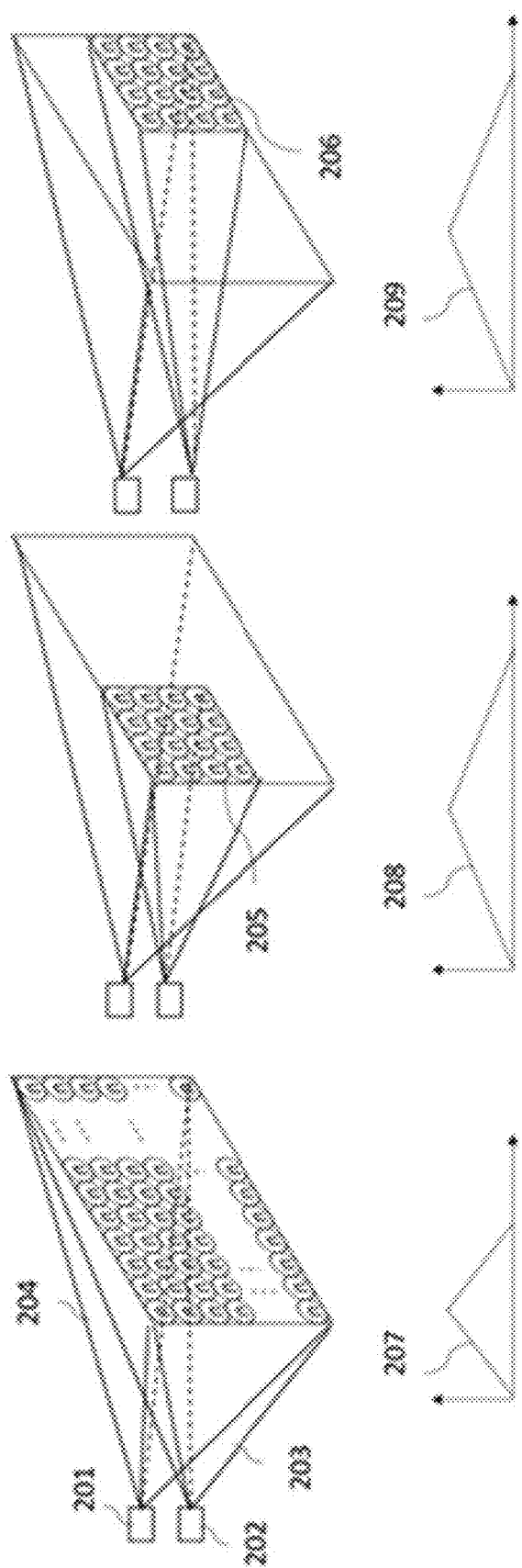

In one embodiment illustrated in FIG. 2B, the transmitter's beam scanning array and the receiver array readout are configured to scan and respectively read the entire common field of view and have a corresponding frequency chirp duration and shape 207. In one embodiment in the subsequent frame or succession of frames the transmitter's beam scanning array and the receiver array readout are configured to scan and respectively read a reduced segment of the common field of view 205 and have a corresponding frequency chirp duration and chirp shape 208, while in the subsequent frame or succession of frames the transmitter's beam scanning array and the receiver array readout are configured to scan and respectively read a different reduced segment 206 and have a corresponding frequency chirp duration and chirp shape 209.

Figure 2C:
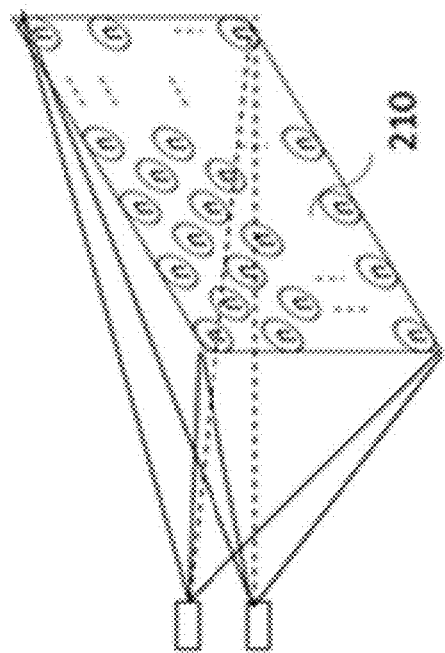
Figure 2C:
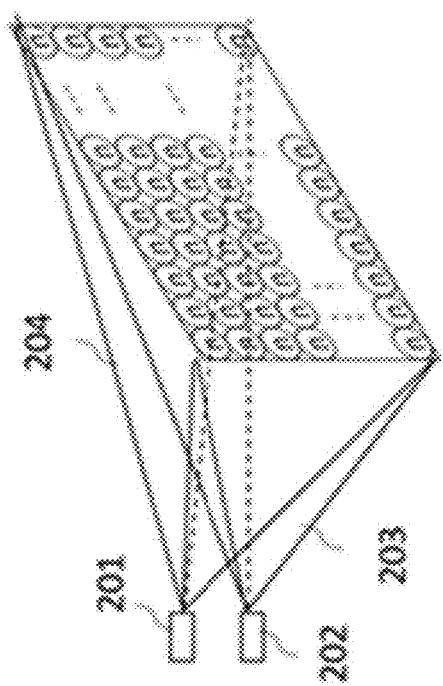
Figure 2D:
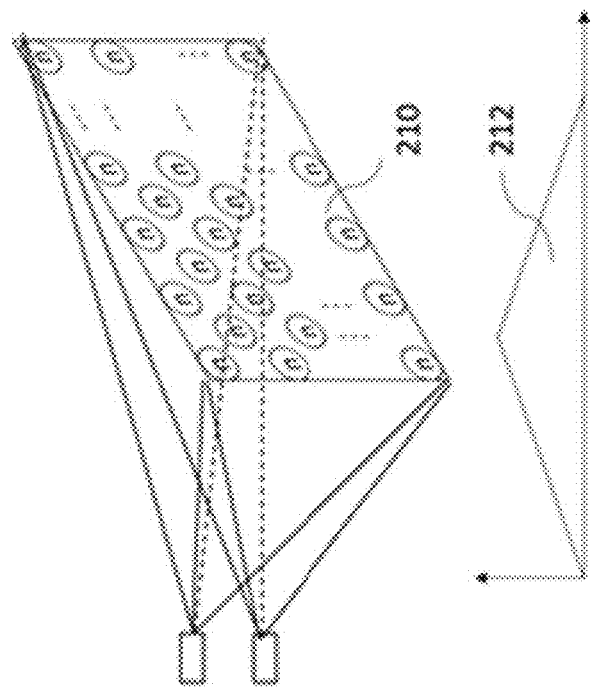
Figure 2D:
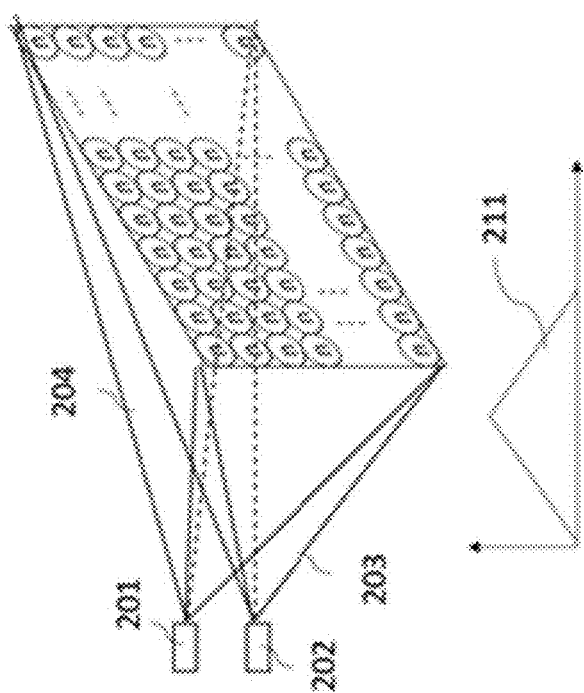
Figure 2E:
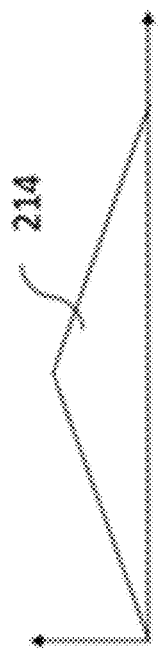
Figure 2E:
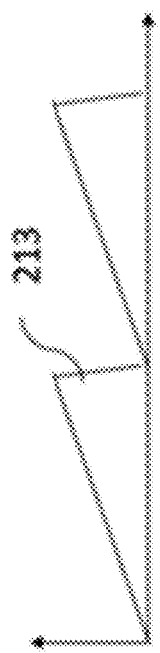

In one embodiment, illustrated in FIG. 2C, the field of view of the transmitter and receiver is maintained at the maximum value between two subsequent frames, while in subsequent frame the sampling is reduced to only a fraction of the number of sampling positions 210. The under sampling of the sampling positions 210 in the subsequent frame may be associated with an increase in duration of illumination for each pixel or group of n pixels and increase in transmitter chirp ramp length from 211 to 212 as illustrated in FIG. 2D. In addition, in any of the previous configurations the shape of the ramp may be modified between subsequent frames from an asymmetric saw tooth 213 to a symmetric up down ramp 214 as shown in FIG. 2E, with the former allowing collection of a larger number of points per second while the latter allowing for the collection of both distance and velocity information at the expense of a lower number of points per second being measured.

Figure 3:
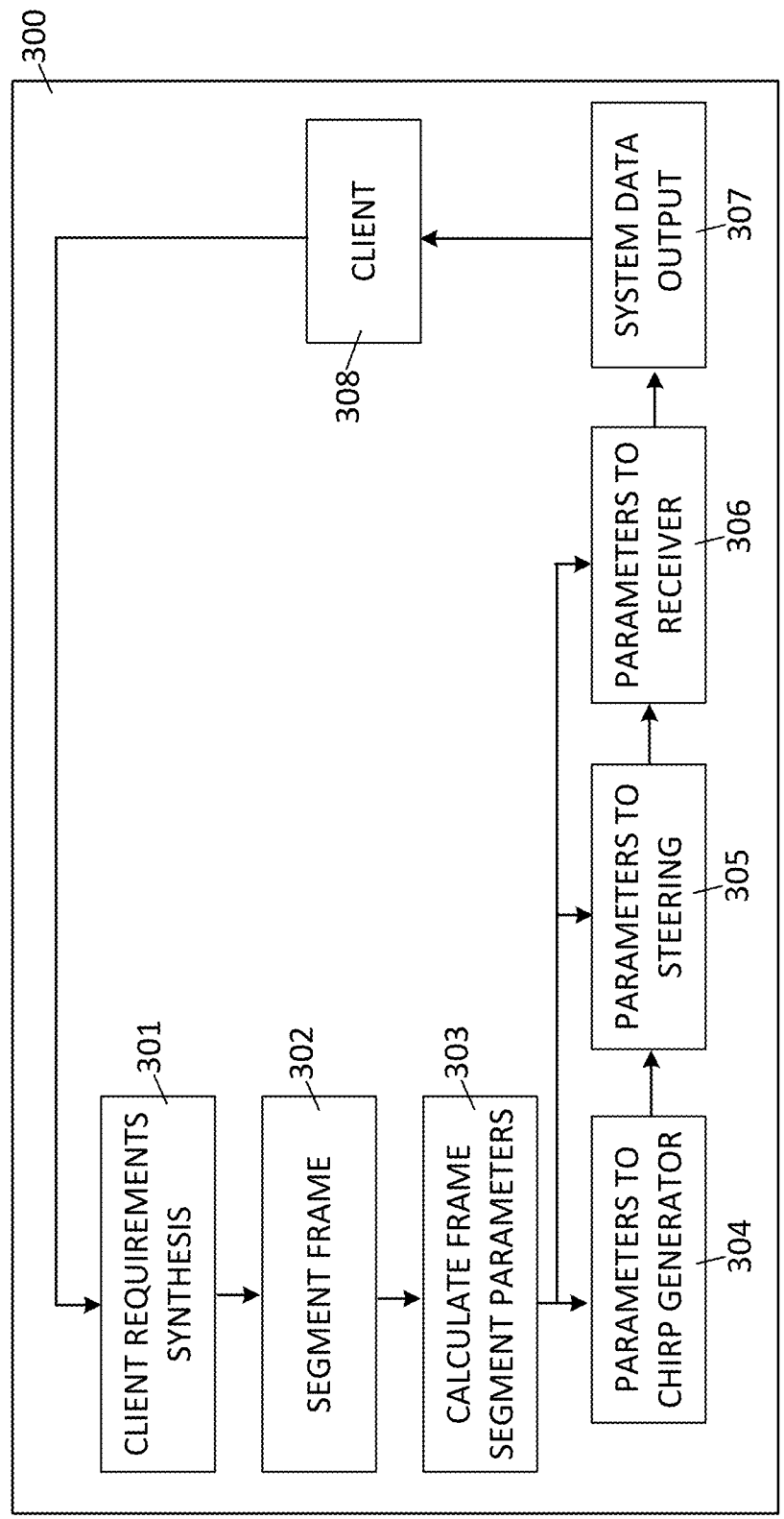
FIG. 3 shows a block diagram of control loop for dual path processing, according to some example embodiments.

In one embodiment illustrated in FIG. 3, the client 308 sends a request to provide information from a segment of the area of the environment being scanned. In response to the request, the system 300 synthesizes the client requirements in client requirements synthesis step 301. Following client requirements synthesis step 301, segmentation step 302 to segment the field of view for the frame is performed and calculation of parameters is performed at parameter calculation step 303, in which field of view segment parameters are generated by a processing unit. The processing unit calculates the new parameters of operation of the system and its modules for each segment of the frame—e.g., length of illumination for each point, shape and length of the frequency chirp, bandwidth of frequency chirp, acquisition frame rate and laser power—that would allow the collection of the requested information with the sufficient accuracy and signal to noise ratio to fulfill the request. As illustrated, the parameter calculation step 303 is followed by distribution of each set of parameters, including parameters to—chirp generator 304, parameters to steering control 305, and parameters to receiver 306—to the corresponding transmitter, steering and receiver modules respectively. In one embodiment, system data output 307 is sent to client 308 and the cycle repeats for the next frame.

Figure 4:
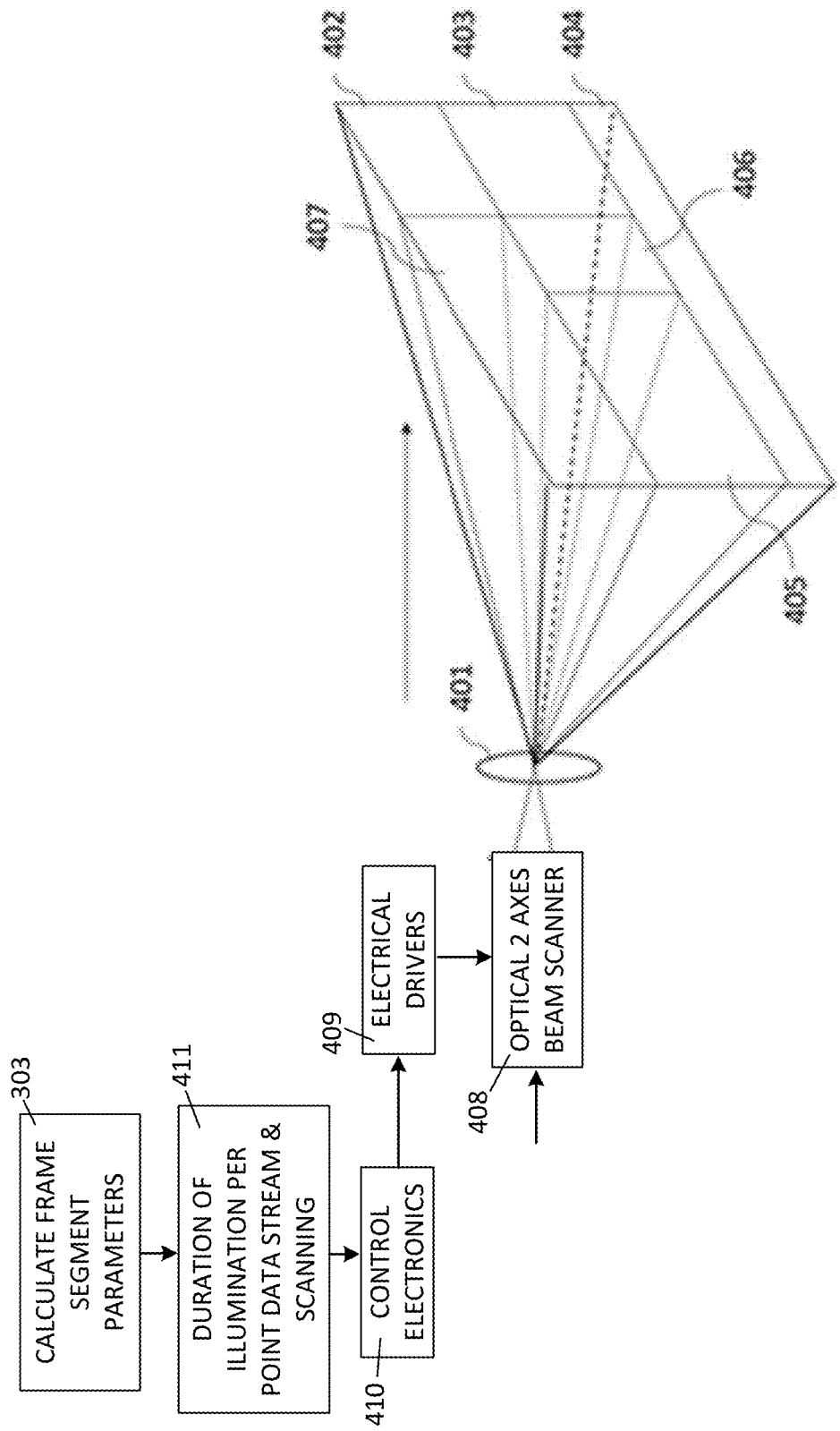
FIG. 4 shows dynamic control architecture for the steering in a dual path approach, according to some example embodiments.

In one embodiment as illustrated in FIG. 4, the calculated parameters for the steering module: duration of illumination per point data stream and scanning pattern 411 are sent to the control electronics 410, which will determine the electrical signals 409 for the electrical drivers. The electrical drivers prepare a sequence of electrical signals 409 that in turn control the optical path characteristics of the two axes optical beam steering module 408. The beam from the two axes optical beam steering module 408 is directed towards lens 401 and outbound towards the target landscape to be illuminated. Each segment of the landscape 402, 403, 404, 405, 406, 407 will be scanned with an optical beam having different characteristics determined by the corresponding set of parameters calculated during the segmentation step 302 and parameter calculation step 303.

Figure 5:
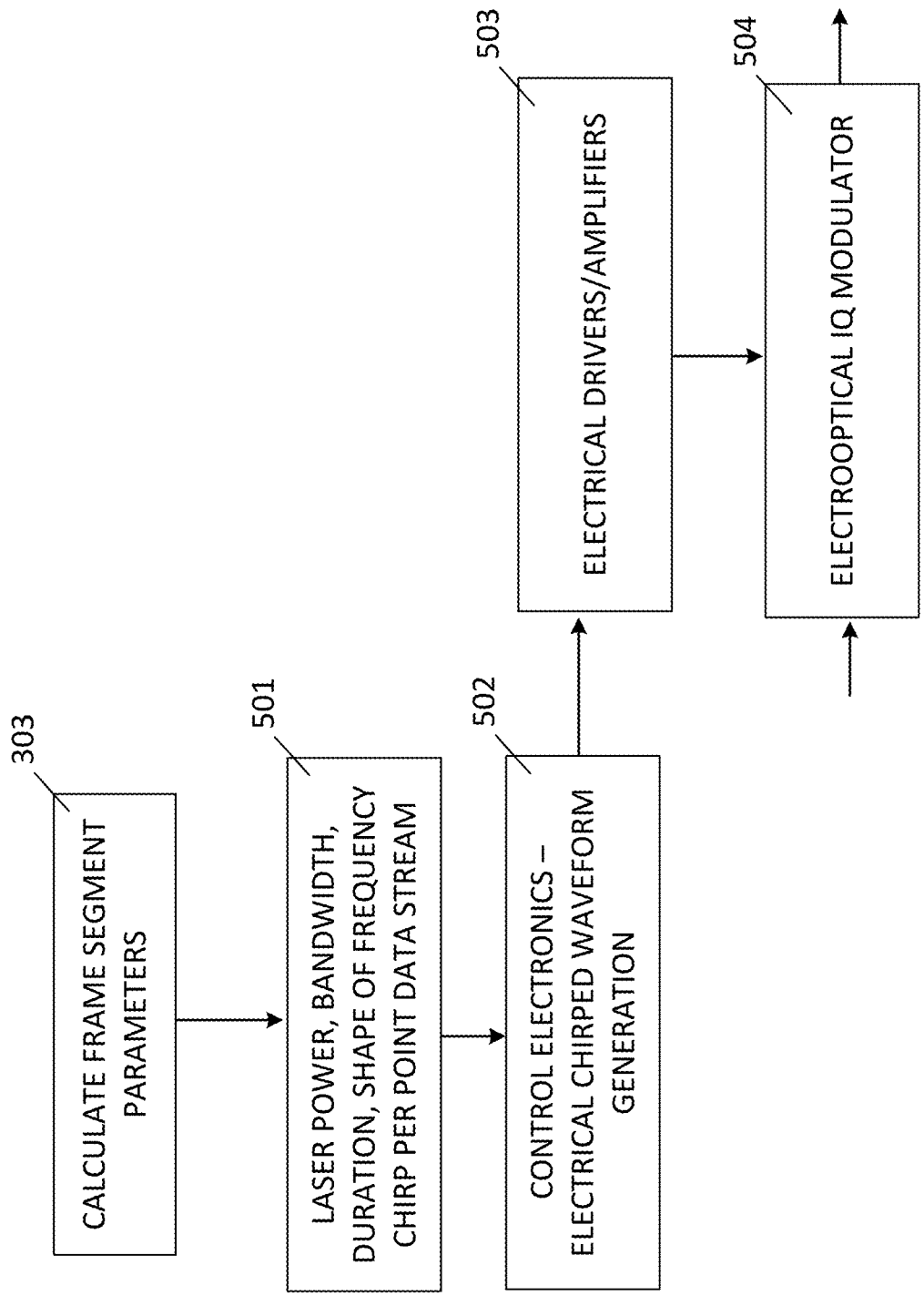
FIG. 5 shows a dynamic control of transmitter dual path configuration, according to some example embodiments.

In one embodiment as illustrated in FIG. 5, the calculated parameters in step 303 for the transmitter module: laser power, frequency chirp bandwidth, duration, shape per point data stream 501 are sent to the control electronics and creation of the electrical signals 502 for the electrical drivers 503 and in turn the characteristics of the optical signal conditioned by the electro optical IQ modulator 504.

Figure 6:
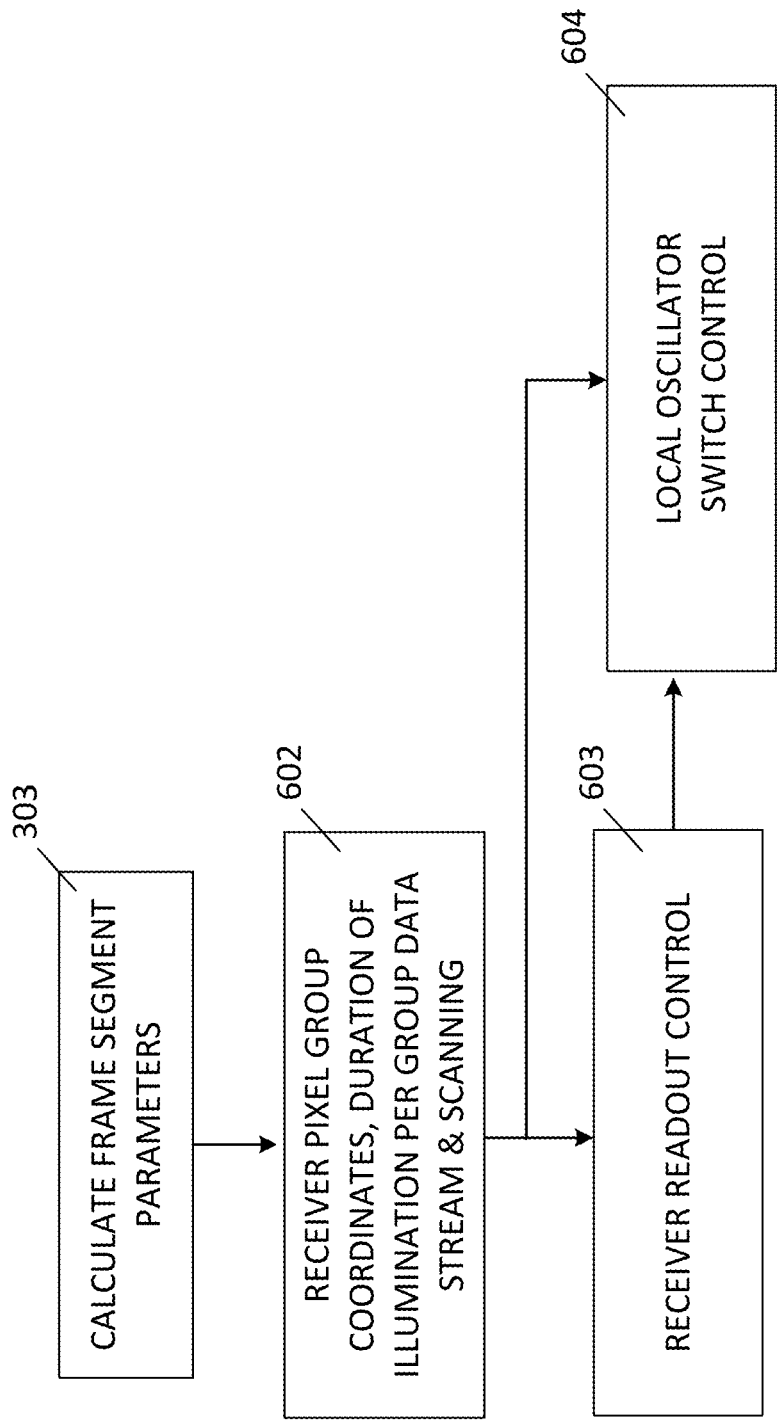
FIG. 6. shows a dynamic control of receiver dual path configuration, according to some example embodiments.

In one embodiment, as illustrated in FIG. 6, the calculated parameters in step 303 for the receiver: receiver pixel group coordinates, duration per group data stream and pattern of illumination 602 are sent to receiver readout control 603 and the receiver local oscillator switch control 604 and serve to synchronize the local oscillator and readout of the receiver with the steering and transmitter patterns of illumination.

Figure 7A:
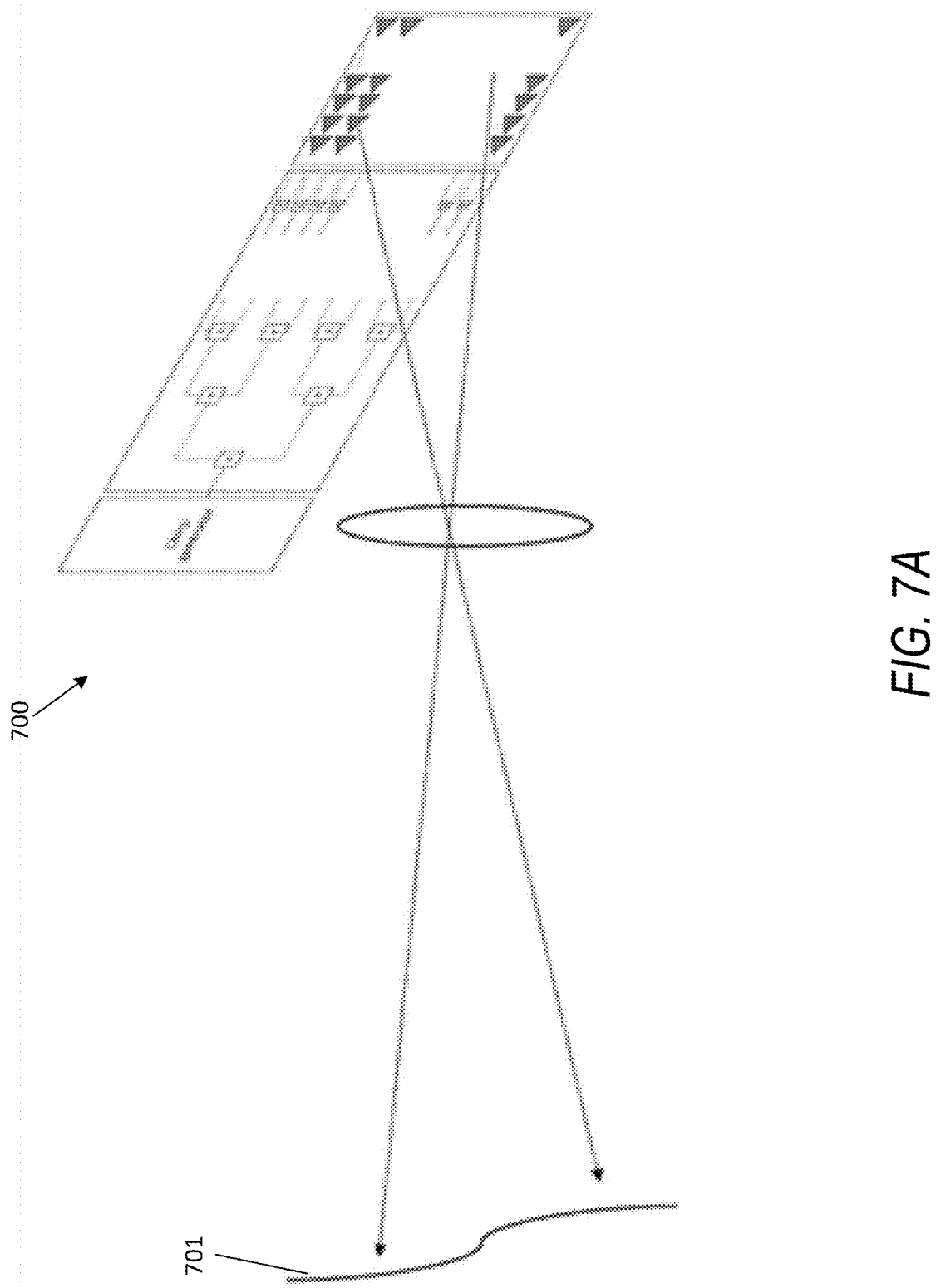
FIG. 7A shows a system view for a transmitter using an integrated chirp generator and a focal plane binary tree architecture steering mechanism, according to some example embodiments.
Figure 7B:
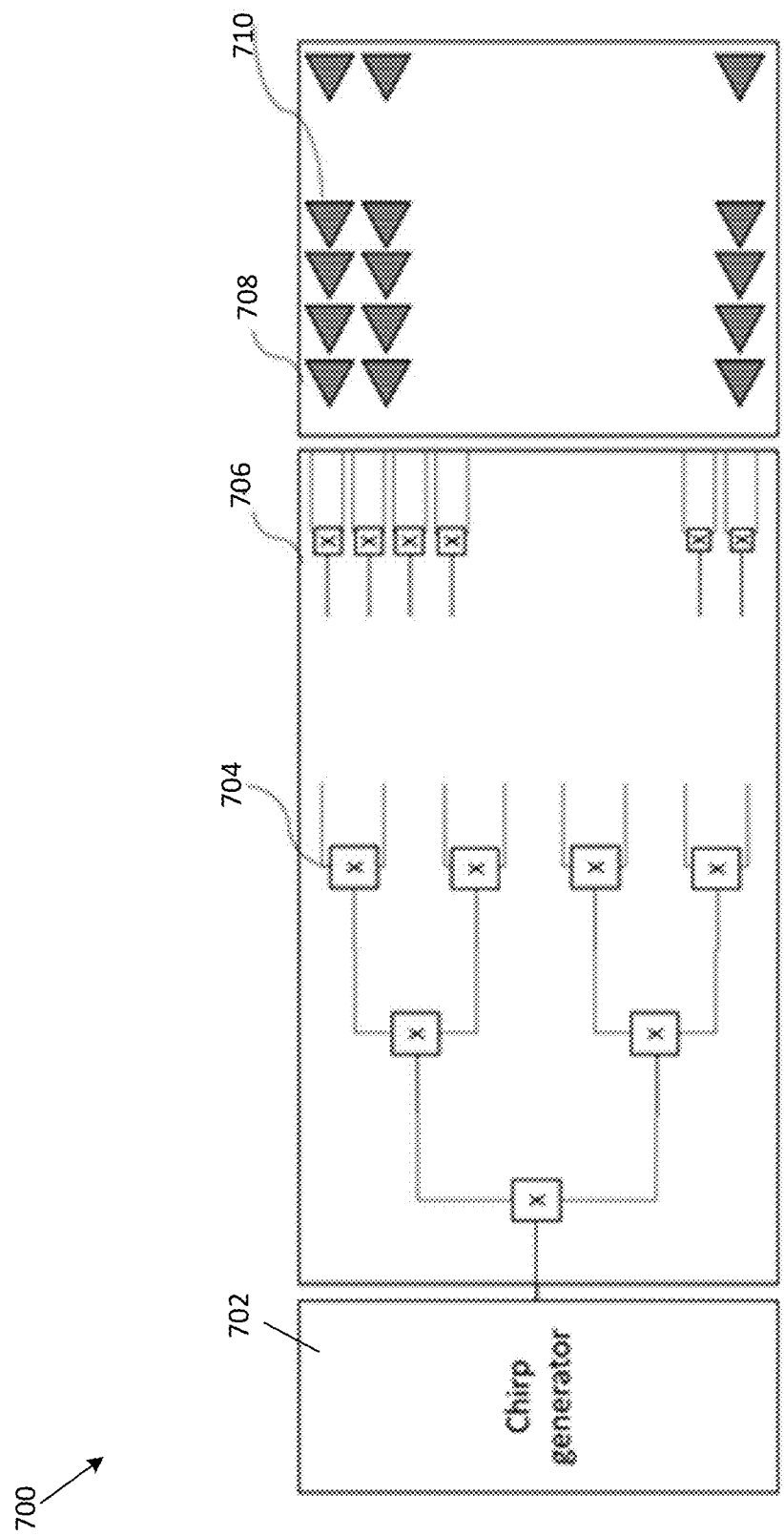
FIG. 7B shows a transmitter using an integrated chirp generator and binary tree switch architecture, according to some example embodiments.

FIG. 7A shows a system view for a transmitter chip 700 using an integrated chirp generator and a focal plane binary tree architecture steering mechanism. As illustrated, the transmitter chip 700 can generate light which is directed towards one or more objects 701. FIG. 7B shows example internal components of the transmitter chip 700, according to some example embodiments. The chip 700 can include a chirp generator 702, which inputs light into the array 706 which comprises a plurality of switches 704 that input light into a transmitter array 710 that comprises a plurality of output elements 708 (e.g., gratings).

Figure 8A:
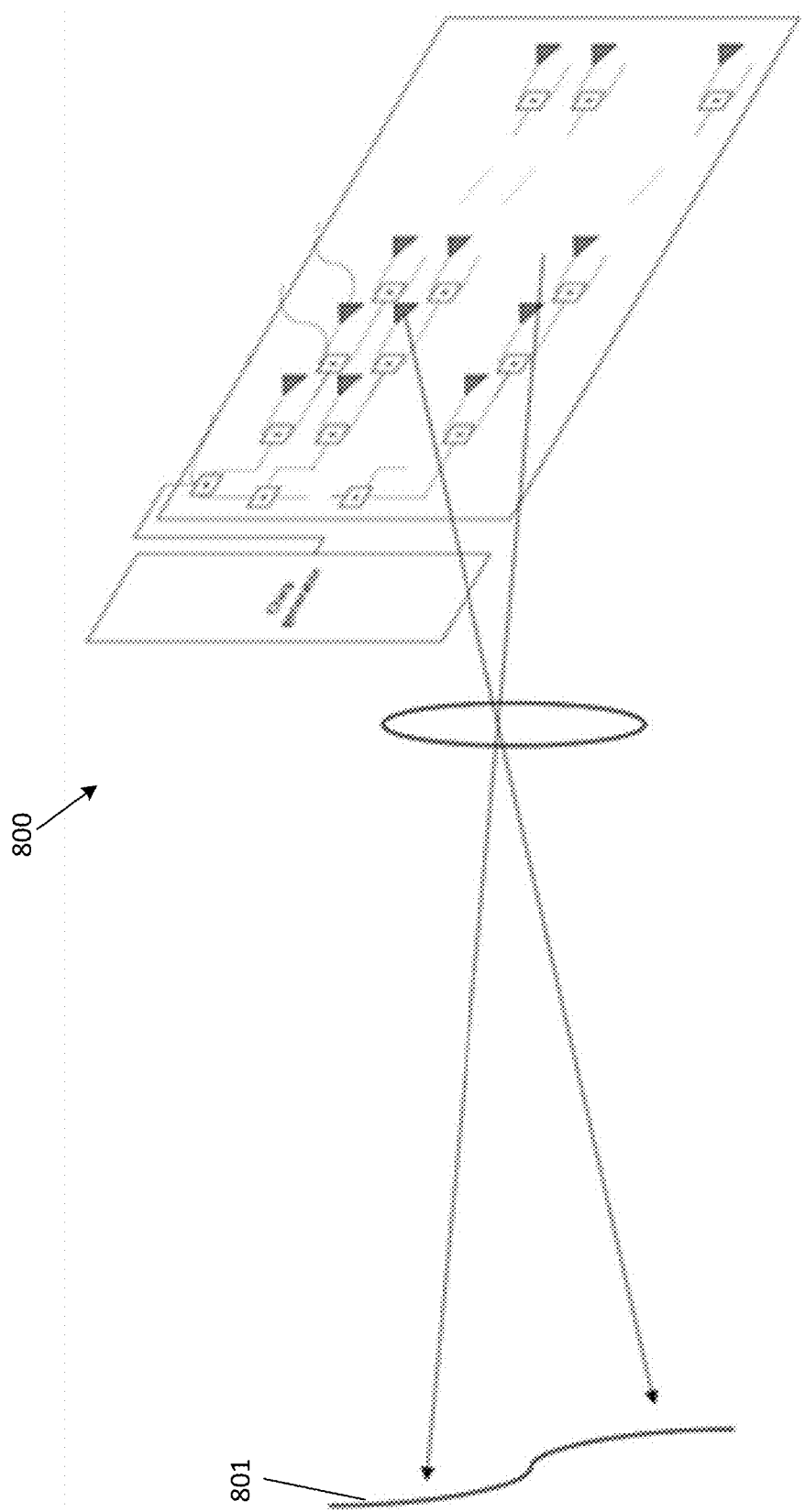
FIG. 8A shows a system view for a transmitter using an integrated chirp generator and a focal plane matrix architecture steering mechanism, according to some example embodiments.

FIG. 8A shows a system view for a transmitter chip 800 using an integrated chirp generator and a focal plane matrix architecture steering mechanism. As illustrated, the transmitter chip 800 can generate light which is directed towards one or more objects 801.

Figure 8B:
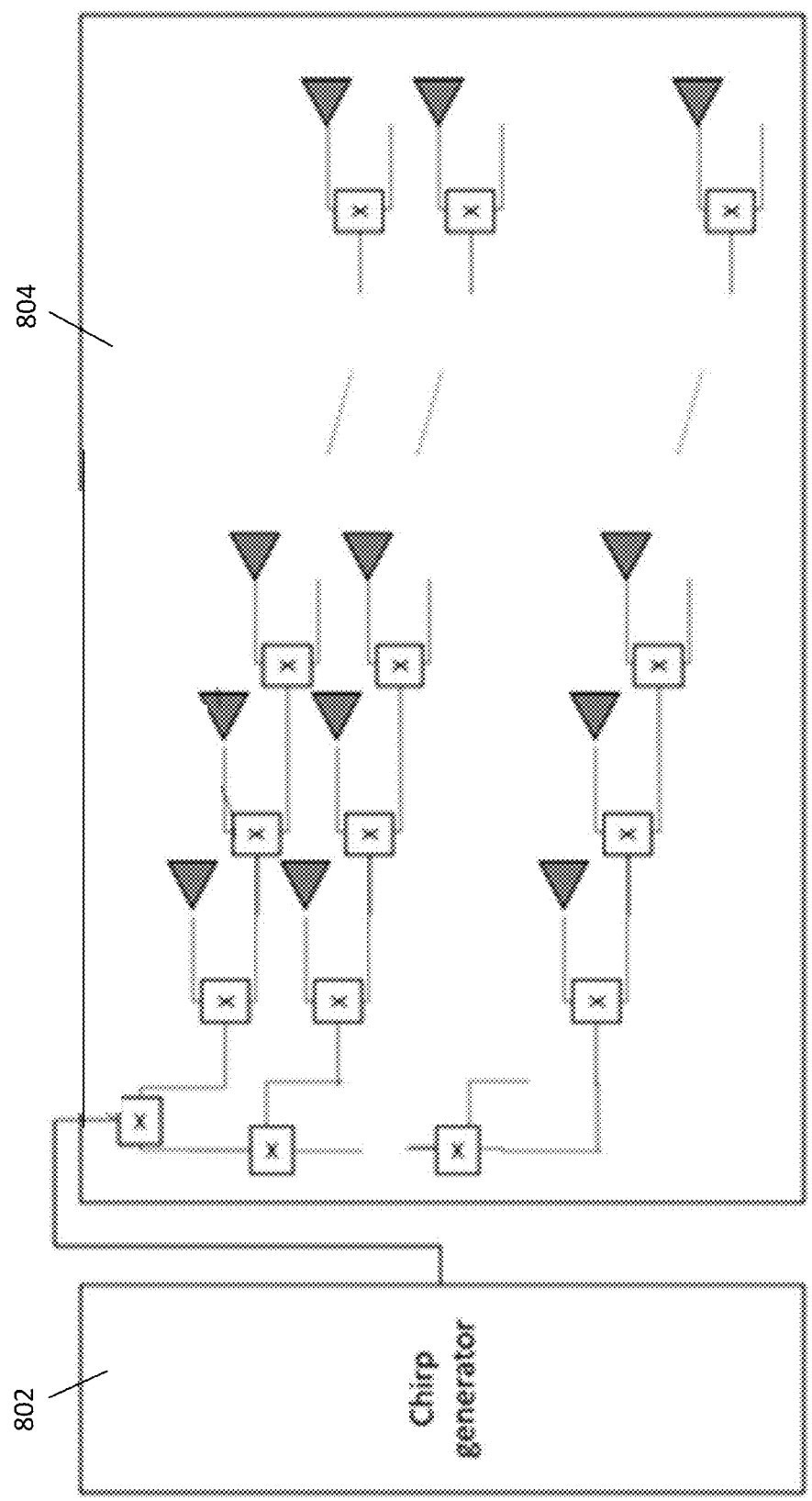
FIG. 8B shows a transmitter using an integrated chirp generator and matrix switch architecture, according to some example embodiments.

FIG. 8B shows example internal components of the transmitter chip 800, according to some example embodiments. In the example of FIG. 8, the chirp generator 802 inputs light into a hybrid array 804 that includes switches that are integrated with output elements. Although in the examples discussed in FIGS. 7A, 7B, 8A, and 8B show transmitters, it is appreciated that the receiver array can likewise be implemented as discussed above. Further, in some example embodiments, the chip functions as a transmitter and receiver. For example, the output elements can output light and further receive reflected light, as discussed in further detail in Application Ser. No. 63/036,114, titled "Microlens Array Lidar System," filed on Jun. 8, 2020, which is hereby incorporate by reference in its entirety.

In one embodiment, the system being configured is a silicon photonics LiDAR based 3D imaging system incorporating a beam steering array as shown in FIGS. 7A, 7B, 8A, and 8B, a silicon photonics in phase quadrature modulator transmitter to generate the frequency chirp. In one embodiment the silicon photonics LiDAR based 3D imaging system contains a silicon photonics receiver composed of an array of pixels (e.g., couplers, gratings, micro-lenses) organized in rows and columns, each pixel containing a balanced heterodyne detector, a 2×2 mixer and a coupler to couple light into the plane of the chip. The field of view of the transmitter comprising chirp generator and beam steering array is divided into field of view segments each characterized by an ensemble of parameters comprised of: duration of illumination for each position of the beam scanning mechanism, laser power per outbound laser beam, length, shape and bandwidth of the frequency chirp, frame rate. In one embodiment the ensemble of parameters for the transmitter are synchronized with the ensemble of parameters for the receiver array.

In one embodiment the readout of the receiver array is configured in order to read the pixels that correspond to the area in the environment that is illuminated by the steering array of the transmitter. In one embodiment, an increase in frame rate can be achieved for a reduced portion of the field of view by scanning that field of view more frequently at the expense of ignoring temporarily the remaining original field of view or scanning it at a reduced frame rate. In one embodiment in order to increase the signal to noise ratio the duration of illumination for each position and the length of the frequency chirp generated by the transmitter may be increased in order to provide longer integration time for each point. In one embodiment the temporal increase in length of the frequency chirp is associated with a reduction in the FOV scanned by the steering mechanism and by a synchronization of the receiver array with the steering mechanism to ensure high efficiency and that areas that are illuminated by the steering module are efficiently read. In one embodiment the increase in chirp length may be in the range of 2-10 times compared to the original chirp length.

Figure 9:
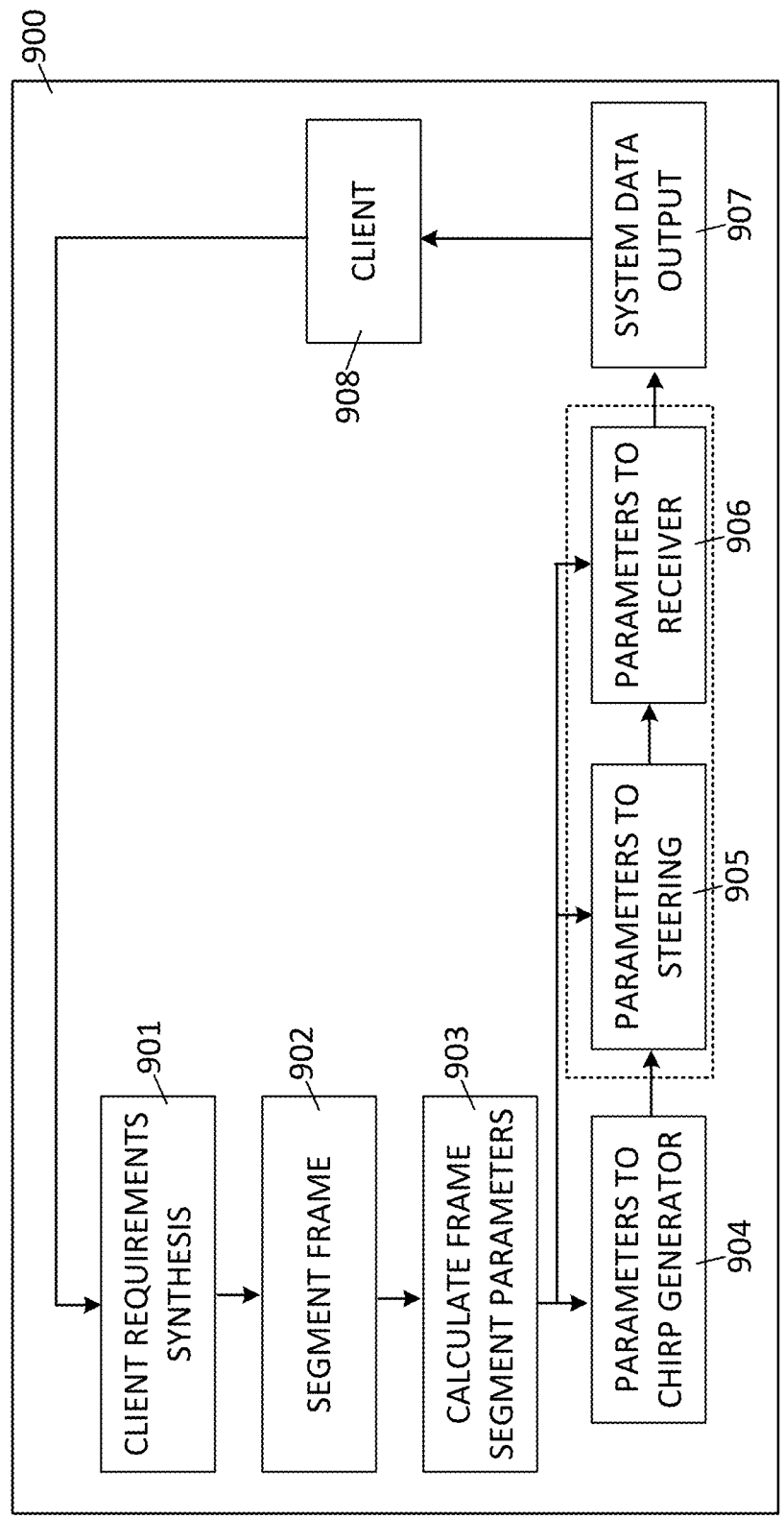
FIG. 9. shows a block diagram of control loop for a single path configuration, according to some example embodiments.

In one embodiment illustrated in FIG. 9, an implementation of the dynamic control of the region of interest is shown when using an integrated frequency modulated continuous wave (CW) LiDAR architecture in which the transmit and receive signals are sharing the same path—single path architecture. The client 908 sends a request to provide information from a segment of the area of the environment being scanned. In response to the request the system 900 synthesizes the client requirements in client requirements synthesis step 901. Following client requirements synthesis step 901, segmentation of the field of view for the frame is performed at segmentation step 902, and parameters are calculated for the field of view segment parameters by a processing unit at parameter calculation step 903. The processing unit calculates the new parameters of operation of the system and its modules for each segment of the frame—length of illumination for each point, shape and length of the frequency chirp, bandwidth of frequency chirp, acquisition frame rate and laser power—that would allow the collection of the requested information with the sufficient accuracy and signal to noise ratio to fulfill the request. Generation of parameters at parameter calculation step 903, which is followed by distribution of each set of parameters 904-906 to the transmitter which generates the frequency chirp and steering parameter sets, which control the simultaneous distribution of signal to the correct output coupler for the outbound signal and of the local oscillator to the corresponding pixel respectively by the local oscillator distribution switch as well as the receiver synchronization with the transmit/outbound path. In one embodiment, system data output 907 is sent to client 908 and the cycle repeats for the next frame.

Figure 10:
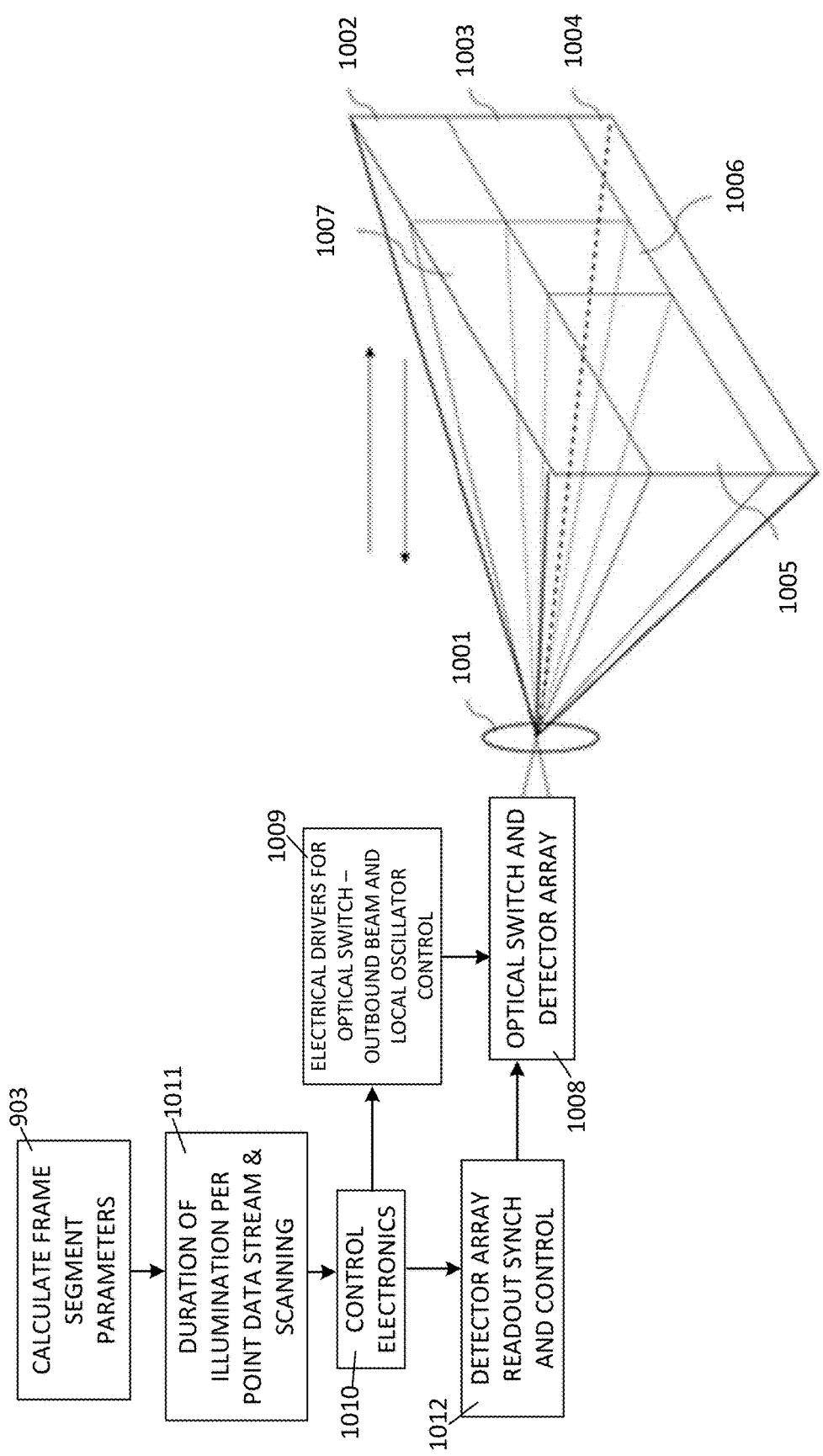
FIG. 10. shows a dynamic control architecture of the single path switch and detector arrays, according to some example embodiments.

In one embodiment as illustrated in FIG. 10, the calculated parameters for the single path module: duration of illumination per point data stream and scanning pattern 1011 are sent to the control electronics 1010, which will determine the electrical signals 1009 for the electrical drivers of the switch for the local oscillator as well as the switch for the outbound optical signal. The electrical drivers prepare a sequence of electrical signals 1009 that in turn control the optical path characteristics of the two axes optical switch and coherent detector array 1008. The beam from the optical switch and coherent detector array 1008 is directed towards lens 1001 and outbound towards the target landscape to be illuminated. Each segment of the landscape 1002, 1003, 1004, 1005, 1006, 1007 will be scanned with an optical beam having different characteristics determined by the corresponding set of parameters calculated during the segmentation step 902 parameter calculation step 903, respectively.

In one embodiment, the dynamic adjustment of the beam scanning, frequency chirp and receiver acquisition may be done from frame to frame or within frame from point to point on a time scale from 100 nanoseconds to 10 milliseconds.

In one embodiment, the client 908 creates a pointcloud or ranging image that represent an ensemble of objects detected within the scanned volume and a three-dimensional model of the scanned volume and objects within it. Each point in the pointcloud can be depicted as a point in three dimensions (e.g., three spatial dimensions, such as x, y, and z), such that the objects that reflect the light are outlined by the various points in the pointcloud. Additional information can be included as additional channels for each point (e.g., velocity data), according to some example embodiments. In one embodiment an object or an ensemble of objects within the scanned volume is being tracked from frame to frame and the frame segmentation and parameters set is chosen in such a way as to be able to efficiently track the object or objects of interest—more specifically to provide the necessary resolution, signal to noise ratio and update rate necessary for tracking. In one embodiment the tracked object is modeled and identified by comparing it with a library of objects.

In one embodiment the LiDAR based 3D imaging system is located on a vehicle and is used to image other vehicles, pedestrians or portion of the road in front of the vehicle.

The system is used in the field of perception of dynamically changing environments and it allows one to separate the space into volumes with different perception requirements and to dynamically adjust in real time perception parameters such as three-dimensional space resolution, signal integration time, field of view, range, signal strength to the perception requirements of the user for each specific volume.

The disclosed system and methods can be implemented in the field of perception for dynamically changing environments for which the various volumes of observation have different perception requirements. Examples of fields of application are autonomous navigation where the environment is changing rapidly and unevenly within the field of view. Also, other areas where the environment could change rapidly and unevenly within the field of view are in object/feature/gesture recognition, site surveying when monitoring an otherwise static site for motion followed by object recognition.

In some example embodiments, the above approaches are implemented in velocity mapping. In particular, a velocity mapping can be added or subtracted dynamically as needed by modifying the form of the frequency ramp from a saw tooth to a symmetric up and down ramp, according to some example embodiments.

Figure 11:
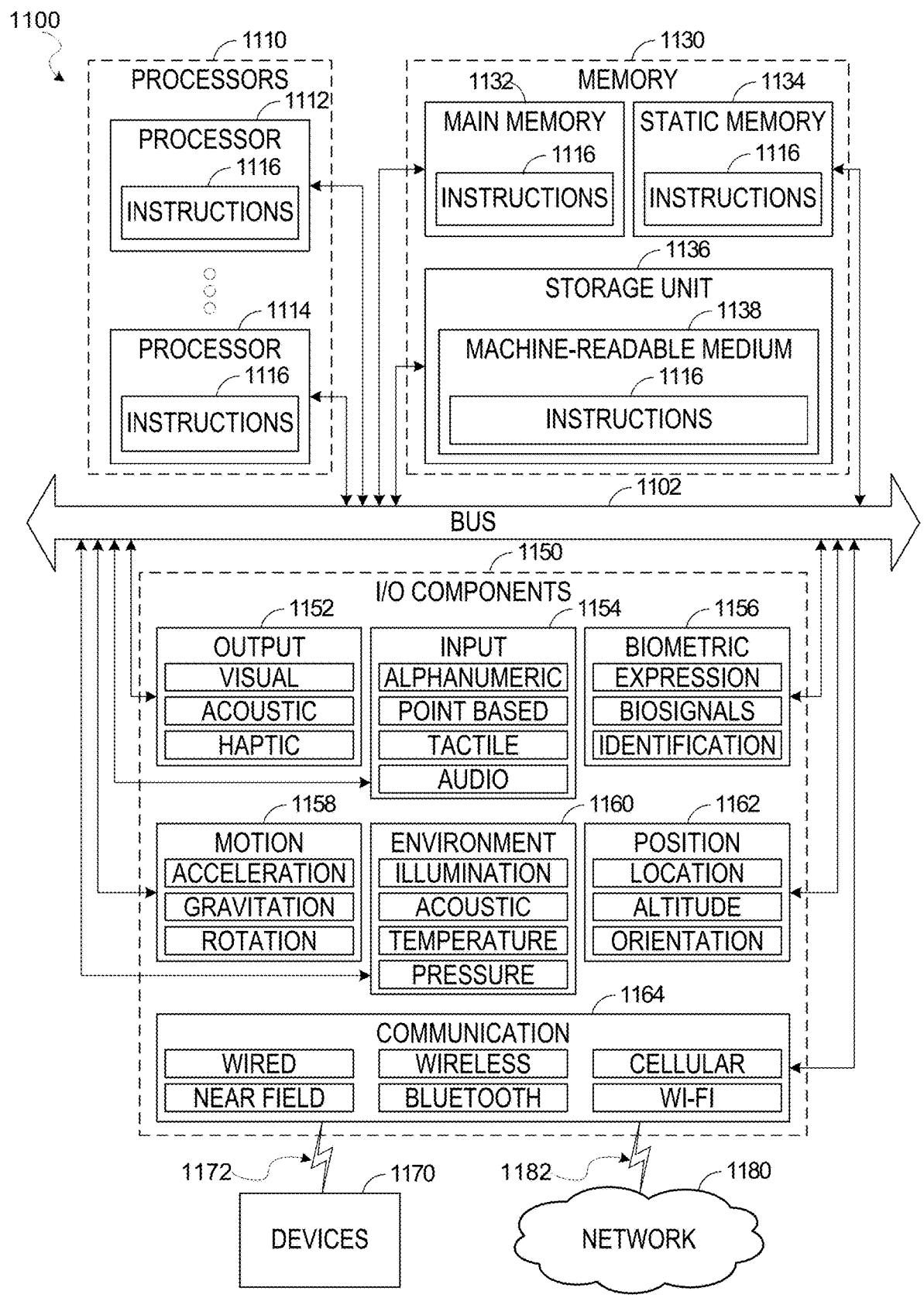
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 illustrates a diagrammatic representation of a machine 1100 in the form of a computer system within which a set of instructions may be executed for causing the machine to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the operations of FIGS. 3-6, and 10. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1111 and a processor 1114 that may execute the instructions 1116. The term "processor" is intended to include multi-core processors that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 may include a main memory 1132, a static memory 1134, and a storage unit 1136, both accessible to the processors 1110 such as via the bus 1102. The main memory 1130, the static memory 1134, and storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or storage unit 1136 may store one or more sets of instructions and data structures (e.g., software) embodying or utilized by any one or more of the methodologies or functions described herein. These instructions (e.g., the instructions 1116), when executed by processor(s) 1110, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The following are example embodiments:

Example 1. A method comprising: generating a plurality of beams of light by a laser, the plurality of beams of light directed towards one or more objects of an environment by a plurality of output couplers of a transmitter array; receiving a plurality of reflected beams of light that are reflected by the one or more objects, the plurality of reflected beams received by a plurality of input couplers of a receiver array; generating, by a processor, a first three-dimensional (3D) ranging image from the plurality of reflected beams, the first 3D ranging image comprising a plurality of segments corresponding to different areas in the first 3D ranging image; generating, by the processor, a request for additional information for one of the plurality of segments of the first 3D ranging image; in response to the request, modifying a laser parameter for a portion of the plurality of output couplers that correspond to the one of the plurality of segments, the modified laser parameter adjusting an optical characteristic of light generated by the laser; generating a plurality of additional beams of light by the laser using the modified laser parameter; and generating, by the processor, a second 3D ranging image from the plurality of additional beams received by the receiver array.

Example 2. The method of example 1, wherein the plurality of additional beams of light are directed towards the one or more objects by the plurality of output couplers of the transmitter array.

Example 3. The method of any of examples 1 or 2, wherein the request is a request for increased resolution for the one of the plurality of segments, and wherein the modified transmitter parameter is an increased power level provided to the laser for the plurality of output couplers that correspond to the one of the plurality of segments.

Example 4. The method of any of examples 1-3, wherein the plurality of beams of light are chirped beams of light.

Example 5. The method of any of examples 1-4, wherein the modified laser parameter includes an increased illumination duration.

Example 6. The method of any of examples 1-5, wherein the modified transmitter parameter includes a modified chirp shape.

Example 7. The method of any of examples 1-6, wherein the modified transmitter parameter is a increased chirp frequency bandwidth.

Example 8. The method of any of examples 1-7, wherein the first 3D ranging image and the second 3D ranging image are included in a plurality of ranging images that are generated at a framerate frequency.

Example 9. The method of any of examples 1-8, further comprising: in response to the request for further information, increasing the framerate frequency of the plurality of 3D ranging images.

Example 10. The method of any of examples 1-9, wherein each of the plurality of 3D ranging images is a 3D point-cloud comprising a plurality of points comprising dimensional values in a plurality of dimensions.

Example 11. The method of any of examples 1-10, wherein the plurality of dimensions comprise three spatial dimensions.

Example 12. The method of any of examples 1-11, wherein the transmitter array is a semiconductor transmitter array.

Example 13. The method of any of examples 1-12, wherein the transmitter array is a semiconductor receiver array.

Example 14. The method of any of examples 1-13, wherein the plurality of input couplers and the plurality of output couplers are grating couplers.

Example 15. A system comprising: one or more processors of a machine; and a memory storing instructions that, when executed by the one or more processors, cause the machine to perform operations comprising: generating a plurality of beams of light by a laser, the plurality of beams of light directed towards one or more objects of an environment by a plurality of output couplers of a transmitter array; receiving a plurality of reflected beams of light that are reflected by the one or more objects, the plurality of reflected beams received by a plurality of input couplers of a receiver array; generating a first three-dimensional (3D) ranging image from the plurality of reflected beams, the first 3D ranging image comprising a plurality of segments corresponding to different areas in the first 3D ranging image; generating a request for additional information for one of the plurality of segments of the first 3D ranging image; in response to the request, modifying a laser parameter or transmitter parameter for a portion of the plurality of output couplers that correspond to the one of the plurality of segments, the modified laser parameter adjusting an optical characteristic of light generated by the laser or transmitter; generating a plurality of additional beams of light by the laser using the modified transmitter parameter; and generating a second 3D ranging image from the plurality of additional beams received by the receiver array.

Example 16. The system of example 15, wherein the plurality of additional beams of light are directed towards the one or more objects by the plurality of output couplers of the transmitter array.

Example 17. The system of example 15 or 16, wherein the request is a request for increased resolution for the one of the plurality of segments, and wherein the modified laser parameter is an increased power level provided to the laser for the plurality of output couplers that correspond to the one of the plurality of segments.

Example 18. The system of any of examples 15-17, wherein the plurality of beams of light are chirped beams of light.

Example 19. The system of any of examples 15-18, wherein the first 3D ranging image and the second 3D ranging image are included in a plurality of ranging images that are generated at a framerate frequency, and wherein the operations further comprise: in response to the request for further information, increasing the framerate frequency of the plurality of 3D ranging images.

Example 20. A computer-storage medium embodying instructions that, when executed by a machine, cause the machine to perform operations comprising: generating a plurality of beams of light by a laser, the plurality of beams of light directed towards one or more objects of an environment by a plurality of output couplers of a transmitter array; receiving a plurality of reflected beams of light that are reflected by the one or more objects, the plurality of reflected beams received by a plurality of input couplers of a receiver array; generating a first three-dimensional (3D) ranging image from the plurality of reflected beams, the first 3D ranging image comprising a plurality of segments corresponding to different areas in the first 3D ranging image; generating a request for additional information for one of the plurality of segments of the first 3D ranging image; in response to the request, modifying a laser or transmitter parameter for a portion of the plurality of output couplers that correspond to the one of the plurality of segments, the modified laser or transmitter parameter adjusting an optical characteristic of light generated by the laser or transmitter; generating a plurality of additional beams of light by the laser using the modified laser or transmitter parameter; and generating a second 3D ranging image from the plurality of additional beams received by the receiver array.

What is claimed is:

1. A method comprising:
   generating a plurality of beams of light by a laser, the plurality of beams of light directed towards one or more objects in a field of view by a plurality of output couplers of a transmitter;
   receiving a plurality of reflected beams of light that are reflected by the one or more objects, the plurality of reflected beams received by a plurality of input couplers of a receiver;
   generating, by a processor, a first three-dimensional (3D) ranging image from the plurality of reflected beams;
   processing, by the processor, a request from a client application for additional information for one of a plurality of segments to be segmented from the field of view;
   segmenting, by the processor, the field of view into the plurality of segments in response to the request from the client application;
   calculating, by the processor, a corresponding set of modified operation parameters for each segment among the plurality of segments of the field of view;
   based on the calculated corresponding set of modified operation parameters for the one of the plurality of segments, modifying a transmitter parameter for a portion of the plurality of output couplers that correspond to the one of the plurality of segments, the modified transmitter parameter adjusting an optical characteristic of light generated output by the transmitter;
   generating a plurality of additional beams of light by the laser using the modified transmitter parameter; and
   generating, by the processor, a second 3D ranging image from the plurality of additional beams received by the receiver, the generated second 3D ranging image to be provided to the client application in fulfilment of the request.

2. The method of claim 1, wherein the segmenting of the field of view is performed for the generating of the second 3D ranging image and performed differently for a third 3D ranging image.

3. The method of claim 1, wherein the request is a request for increased resolution for the one of the plurality of segments, and wherein a corresponding set of modified operation parameters for a different one of the plurality of segments causes the different one of the plurality of segments to not be scanned in the generating of the second 3D ranging image.

4. The method of claim 1, wherein the plurality of beams of light are chirped beams of light.

5. The method of claim 4, wherein the modified transmitter parameter includes an increased illumination duration.

6. The method of claim 4, wherein the modified transmitter parameter includes a modified chirp shape.

7. The method of claim 6, wherein the modified transmitter parameter is an increased chirp frequency bandwidth.

8. The method of claim 1, wherein the first 3D ranging image and the second 3D ranging image are included in a plurality of ranging images that are generated at a framerate frequency.

9. The method of claim 8, further comprising:
in response to the request for further information, increasing the framerate frequency of the plurality of 3D ranging images.

10. The method of claim 8, wherein each of the plurality of 3D ranging images is a 3D pointcloud comprising a plurality of points comprising dimensional values in a plurality of dimensions.

11. The method of claim 10, wherein the plurality of dimensions comprise three spatial dimensions and a velocity dimension.

12. The method of claim 1, wherein the transmitter is a semiconductor transmitter.

13. The method of claim 1, wherein the transmitter is a semiconductor receiver.

14. The method of claim 1, wherein the plurality of input couplers and the plurality of output couplers are grating couplers.

15. A system comprising:
one or more processors of a machine; and
a memory storing instructions that, when executed by the one or more processors, cause the machine to perform operations comprising:
generating a plurality of beams of light by a laser, the plurality of beams of light directed towards one or more objects in a field of view by a plurality of output couplers of a transmitter;
receiving a plurality of reflected beams of light that are reflected by the one or more objects, the plurality of reflected beams received by a plurality of input couplers of a receiver;
generating a first three-dimensional (3D) ranging image from the plurality of reflected beams;
processing a request from a client application for additional information for one of a plurality of segments to be segmented from the field of view;
segmenting the field of view into the plurality of segments in response to the request from the client application;
calculating a corresponding set of modified operation parameters for each segment among the plurality of segments of the field of view;
based on the calculated corresponding set of modified operation parameters for the one of the plurality of segments, modifying a transmitter parameter for a portion of the plurality of output couplers that correspond to the one of the plurality of segments, the modified transmitter parameter adjusting an optical characteristic of light generated by the laser;

generating, by the transmitter, a plurality of additional beams of light by the laser using the modified transmitter parameter; and
generating a second 3D ranging image from the plurality of additional beams received by the receiver, the generated second 3D ranging image to be provided to the client application in fulfilment of the request.

16. The system of claim 15, wherein the segmenting of the field of view is performed for the generating of the second 3D ranging image and performed differently for a third 3D ranging image.

17. The system of claim 15, wherein the request is a request for increased resolution for the one of the plurality of segments, and wherein a corresponding set of modified operation parameters for a different one of the plurality of segments causes the different one of the plurality of segments to not be scanned in the generating of the second 3D ranging image.

18. The system of claim 15, wherein the plurality of beams of light are chirped beams of light.

19. The system of claim 15, wherein the first 3D ranging image and the second 3D ranging image are included in a plurality of ranging images that are generated at a framerate frequency, and wherein the operations further comprise: in response to the request for further information, increasing the framerate frequency of the plurality of 3D ranging images.

20. A computer-storage medium embodying instructions that, when executed by a machine, cause the machine to perform operations comprising:
generating a plurality of beams of light by a laser, the plurality of beams of light directed towards one or more objects in a field of view by a plurality of output couplers of a transmitter;
receiving a plurality of reflected beams of light that are reflected by the one or more objects, the plurality of reflected beams received by a plurality of input couplers of a receiver;
generating a first three-dimensional (3D) ranging image from the plurality of reflected beams;
processing a request from a client application for additional information for one of a plurality of segments to be segmented from the field of view;
segmenting the field of view into the plurality of segments in response to the request from the client application;
calculating a corresponding set of modified operation parameters for each segment among the plurality of segments of the field of view;
based on the calculated corresponding set of modified operation parameters for the one of the plurality of segments, modifying a transmitter parameter for a portion of the plurality of output couplers that correspond to the one of the plurality of segments, the modified transmitter parameter adjusting an optical characteristic of light output by the transmitter;
generating, by the transmitter, a plurality of additional beams of light using the modified transmitter parameter; and
generating a second 3D ranging image from the plurality of additional beams received by the receiver, the generated second 3D ranging image to be provided to the client application in fulfilment of the request.

* * * * *

UNITED STATES PATENT AND TRADEMARK OFFICE
CERTIFICATE OF CORRECTION

| | | |
|---|---|---|
| PATENT NO. | : 11,879,979 B2 | Page 1 of 1 |
| APPLICATION NO. | : 17/033262 | |
| DATED | : January 23, 2024 | |
| INVENTOR(S) | : Piggott et al. | |

It is certified that error appears in the above-identified patent and that said Letters Patent is hereby corrected as shown below:

In the Drawings

Sheet 10 of 18, Fig. 5, reference numeral 504, Line 1, delete "ELECTROOPTICAL" and insert --ELECTRO OPTICAL-- therefor In the Specification In Column 9, Line 11, delete "1111" and insert --1112-- therefor In the Claims In Column 16, Line 24, in Claim 19, after "comprise:", insert --¶--

Signed and Sealed this
Ninth Day of April, 2024

Katherine Kelly Vidal
*Director of the United States Patent and Trademark Office*